(12) United States Patent
Takahashi et al.

(10) Patent No.: US 7,493,870 B2
(45) Date of Patent: Feb. 24, 2009

(54) PET WASTE ABSORPTION SHEET AND PROCESS FOR MANUFACTURING THE SAME

(75) Inventors: Masayuki Takahashi, Shinagawa-ku (JP); Shinya Kaneko, Shinagawa-ku (JP); Takeshi Ikegami, Shinagawa-ku (JP)

(73) Assignee: Uni-Charm Petcare Corporation, Tokyo (JP)

( * ) Notice: Subject to any disclaimer, the term of this patent is extended or adjusted under 35 U.S.C. 154(b) by 29 days.

(21) Appl. No.: 11/328,746

(22) Filed: Jan. 9, 2006

(65) Prior Publication Data

US 2006/0200105 A1    Sep. 7, 2006

(30) Foreign Application Priority Data

Mar. 1, 2005    (JP)    ............................. 2005-056441

(51) Int. Cl.
*A01K 29/00*    (2006.01)
*A01K 1/015*    (2006.01)

(52) U.S. Cl. ...................................... 119/171; 119/526

(58) Field of Classification Search ................ 119/526, 119/169, 61, 652, 161; 604/370, 372
See application file for complete search history.

(56) References Cited

U.S. PATENT DOCUMENTS 3,963,029 A    6/1976    Brooks et al.
5,342,333 A *  8/1994    Tanzer et al. ................. 604/359
H1732 H *      6/1998    Johnson ........................ 428/68
6,277,105 B1 * 8/2001    Rynish .................... 604/385.02
6,761,955 B2 * 7/2004    Mizutani et al. ............. 428/126
6,960,702 B1  11/2005    Kawakami et al.
2003/0171726 A1 9/2003   Onishi et al.

FOREIGN PATENT DOCUMENTS

| | | |
|---|---|---|
| JP | 05-039258 U | 5/1993 |
| JP | 09-187183 A | 7/1997 |
| JP | 11-332413 A | 12/1999 |
| JP | 2001-008568 A | 1/2001 |
| JP | 2003-092940 A | 4/2003 |
| JP | 2004-049233 A | 2/2004 |
| JP | 2004-187597 A | 7/2004 |
| JP | 2004-242516 A | 9/2004 |

\* cited by examiner

*Primary Examiner*—Michael R Mansen
*Assistant Examiner*—Monica L Williams
(74) *Attorney, Agent, or Firm*—Darby & Darby P.C.

(57) ABSTRACT

A pet waste absorption sheet includes: a liquid-impermeable backsheet; a liquid-permeable topsheet; and an absorbent core disposed between the backsheet and the topsheet. The topsheet has a chemical solution containing at least one component selected from the group consisting of perfume, deodorant, and sterilant.

5 Claims, 4 Drawing Sheets

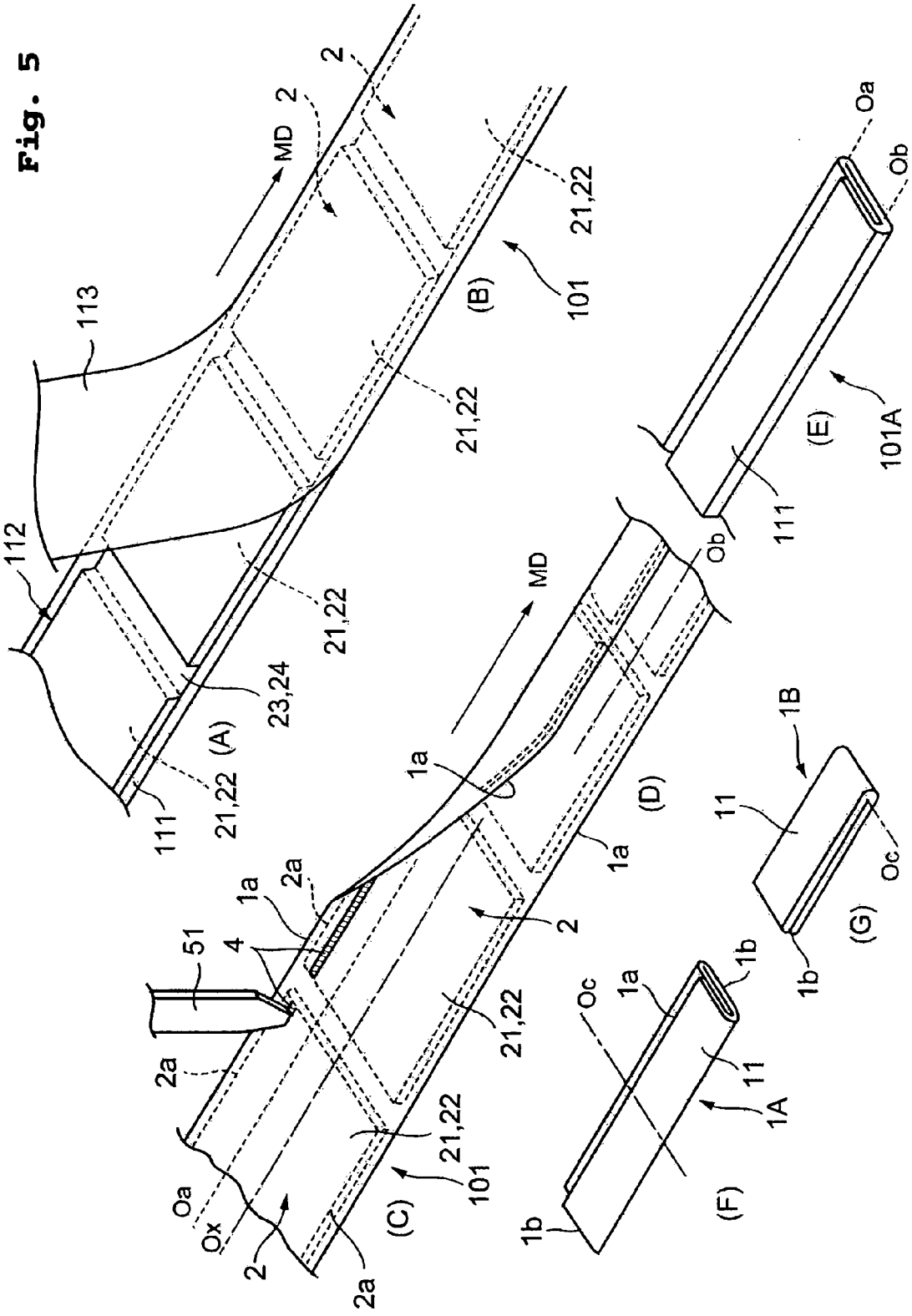

PET WASTE ABSORPTION SHEET AND PROCESS FOR MANUFACTURING THE SAME

BACKGROUND OF THE INVENTION

1. Field of the Invention

The present invention relates to a pet waste absorption sheet intended to be spread on a floor, a bottom face of a tray-type pet toilet, or the like and a process for manufacturing the same.

2. Description of the Related Art

Typically, pet waste absorption sheets have a liquid-impermeable backsheet on a lower surface side, a liquid-permeable topsheet on an upper surface side, and an absorbent core disposed between the backsheet and the topsheet. Such pet waste absorption sheets are intended to be spread on a floor or the like with the lower surface directed downward, so that pets can step on the upper surface of the pet waste absorption sheet.

In a pet mat disclosed in Japanese Unexamined Patent Application Publication No. 2004-187597, the backsheet is a nonwoven fabric laminated with a waterproof film. The absorbent core, which lies on the backsheet, is a pulp layer covered with water absorbent polymer and further wrapped in a carrier tissue. The topsheet, which covers the upper surface of the absorbent core, is a nonwoven fabric. After absorption of urine discharged from dogs and cats, however, the pet mat of JP 2004-187597 tends to emit an offensive odor because no measures are taken.

In Japanese Unexamined Patent Application Publication No. 2004-242516, there is disclosed a deodorant for pets. In this invention, a spraying container is filled with a deodorant composition in liquid form and a deodorant composition in powder form. After a pet discharges waste onto pet litter, the deodorant of JP 2004-242516 can be sprayed over the pet litter. However, it is painful to spray the deodorant over the pet litter every time the pet discharges waste.

In Japanese Unexamined Utility-Model Application Publication No. H05-039258, on the other hand, there is disclosed a pet waste absorption sheet whose absorbent core contains microcapsules filled with perfume. The perfume is intended to emit an aroma smell through fine pores of the microcapsules. However, the perfume contained in the absorbent core is not sufficiently effective in deodorizing urine adhering to the topsheet. In the pet waste absorption sheet, the urine adhering to the topsheet emits an offensive odor such as ammonia odor when it evaporates from the topsheet.

In addition, the microcapsules contained in the absorbent core are liable to adhere to a conveyor or roller of a production line at a step of feeding the absorbent core onto the backsheet or bonding the topsheet to the upper surface of the absorbent core. This reduces the amount of perfume contained in the absorbent core to decrease yields. Moreover, since the perfume contained in the absorbent core easily comes into contact with the air during the manufacturing process, the deodorizing effect tends to decrease due to volatilization of the perfume during the manufacturing process.

Furthermore, the production line needs frequent cleaning to remove the perfume from the conveyor or roller. Particularly when another product is to be produced on the same production line as the pet waste absorption sheet with the perfume microcapsules, the whole production line needs cleaning, thereby increasing the steps for changeover.

SUMMARY OF THE INVENTION

The present invention has been developed to solve the problems in the prior art set forth above and has an object to provide a pet waste absorption sheet which is effective and long lasting in deodorizing, perfuming, or sterilizing.

It is another object of the present invention to provide a process for manufacturing a pet waste absorption sheet which is effective in preventing a chemical solution from adhering to a production line to minimize the need for cleaning.

According to a first aspect of the present invention, there is provided a pet waste absorption sheet comprising:
 a liquid-impermeable backsheet;
 a liquid-permeable topsheet; and
 an absorbent core disposed between the backsheet and the topsheet, the topsheet having a chemical solution containing at least one component selected from the group consisting of perfume, deodorant, and sterilant.

In the pet waste absorption sheet, the chemical solution of the topsheet ensures that urine applied to the topsheet will be deodorized or sterilized during migration to the absorbent core. Particularly, the perfume and deodorant are effective against an offensive odor such as ammonia odor from the urine.

Accordingly, the topsheet is preferably a nonwoven fabric impregnated with the chemical solution. Alternatively, the topsheet may be a resin film formed with apertures for passage of liquid.

Preferably, the pet waste absorption sheet is folded for packaging such that at least a portion of the topsheet is folded upon itself to have the chemical solution between confronting faces of the topsheet. When thus packaged, the components of the chemical solution can be confined between the confronting faces of the topsheet and effectively prevented from diffusing inside a package. Therefore, the effects of the perfume, deodorant, and sterilant can be maintained until the package is opened. Moreover, since the chemical solution can be transferred from one confronting face to the other confronting face, the chemical solution can spread over a larger area of the topsheet than before folding.

Also preferably, another portion of the topsheet is folded upon the backsheet and free of the chemical solution. This prevents the chemical solution of the topsheet from adhering to the exterior surface of the backsheet and decreasing in quantity.

According to a second aspect of the present invention, there is provided a process for manufacturing a pet waste absorption sheet, comprising:
(a) a step of forming a composite of a liquid-impermeable backsheet, a liquid-permeable topsheet, and an absorbent core disposed between the backsheet and the topsheet; and
(b) a step of applying a chemical solution to the topsheet after formation of the composite, the chemical solution containing at least one component selected from the group consisting of perfume, deodorant, and sterilant.

In the manufacturing process, since the chemical solution is applied to the topsheet after formation of the composite, the pet waste absorption sheet can be packaged immediately after the application of the chemical solution, preventing the components of the chemical solution from volatilizing to the air and ensuring the effects of the perfume, deodorant, and sterilant.

The manufacturing process may further comprise a step (c) of folding the composite after the step (b). At the step (c), preferably, a portion of the topsheet is folded upon itself to have the chemical solution between confronting faces of the topsheet. At the step (c), also preferably, another portion of the topsheet is folded upon the backsheet and free of the chemical solution.

At the step (b), the chemical solution may be applied by bringing a coater into contact with the topsheet. Applying the chemical solution with the coater kept in contact with the topsheet prevents loss of the chemical solution due to dispersion into the ambient air during the manufacturing process, thereby increasing yields.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings:

FIG. 5 is a schematic diagram showing a manufacturing process of a pet waste absorption sheet.

DESCRIPTION OF THE PREFERRED EMBODIMENT

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscuring of the present invention.

Figure 1:
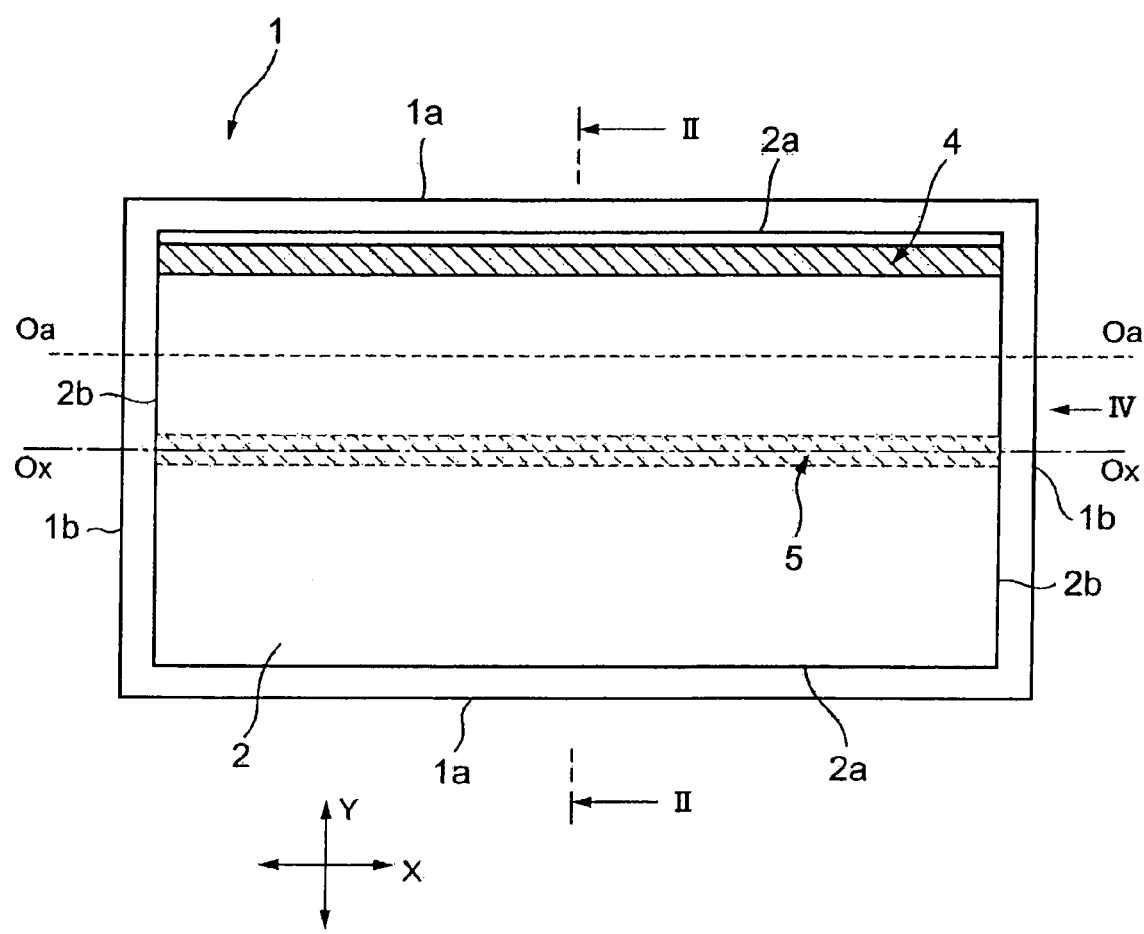
FIG. 1 is a plan view of a pet waste absorption sheet according to one embodiment of the present invention.
Figure 2:
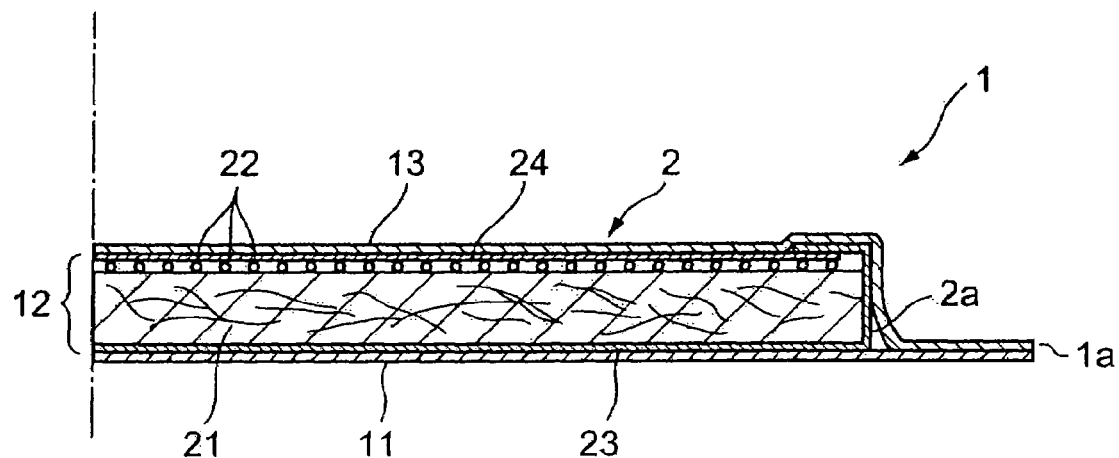
FIG. 2 is a half sectional view taken along line II-II of FIG. 1.
Figure 3:
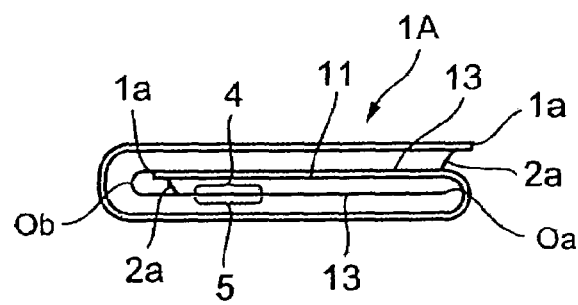
FIG. 3 is an end view showing a state where the pet waste absorption sheet of FIG. 1 is folded for packaging.
Figure 4:
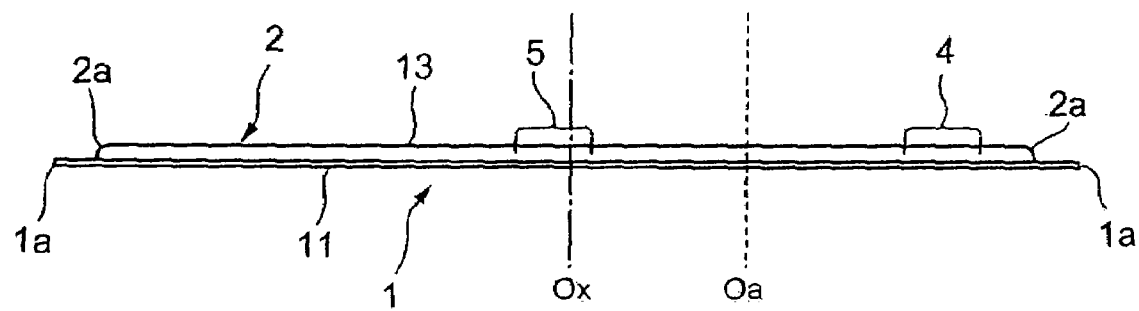
FIG. 4 is an end view taken in the direction of arrow IV, showing a state where the pet waste absorption sheet of FIG. 1 is spread on a flat surface.

FIG. 1 is a plan view of a pet waste absorption sheet 1 according to one embodiment of the present invention, and FIG. 2 is a half sectional view taken along line II-II of FIG. 1. FIG. 3 is an end view showing a state where the pet waste absorption sheet 1 is folded for packaging, and FIG. 4 is an end view taken in the direction of arrow IV, showing a state where the pet waste absorption sheet 1 is spread on a flat surface.

The pet waste absorption sheet 1 shown in FIG. 1 is of a rectangular shape having a pair of long sides 1a and a pair of short sides 1b. The long side 1a may extend 300 to 1,200 mm along an X-direction, which is a workpiece feed direction (or machine direction: MD) in the manufacturing process of the pet waste absorption sheet 1; the short side 1b may extend 200 to 900 mm along a Y-direction. The size of the pet waste absorption sheet 1 is not limited to the above range but may vary depending on the type of pet.

The pet waste absorption sheet 1 centrally has an absorbent region 2. The absorbent region 2 is also of a rectangular shape having a pair of long sides 2a and a pair of short sides 2b. Between the long sides 1a, 2a and between the short sides 1b, 2b, there is provided a peripheral region having a width of about 10 to 50 mm.

In the sectional view of FIG. 2, the pet waste absorption sheet 1 is depicted thicker than it really is for the sake of clarity. Individual components of the pet waste absorption sheet 1 have upper and lower surfaces. As used herein, the term "upper surface" refers to one surface intended to receive liquid discharged from a pet, and the term "lower surface" refers to the other surface intended to face a floor or the like.

As shown in the sectional view of FIG. 2, the pet waste absorption sheet 1 includes a liquid-impermeable backsheet 11, an absorbent core 12 laid on the backsheet 11, and a liquid-permeable topsheet 13 covering the upper surface of the absorbent core 12. The absorbent region 2 refers to an area where the absorbent core 12 is present. Between the long sides 1a, 2a and between the short sides 1b, 2b, the backsheet 11 and the topsheet 13 are directly bonded to each other without interposing the absorbent core 12. If desired, a thin absorbent sheet such as hydrophilic paper may be interposed between the backsheet 11 and the topsheet 13 outside the absorbent region 2 to ensure a certain degree of liquid absorption in the peripheral region.

The backsheet 11 may be a resin film such as of polyethylene resin.

The absorbent core 12 may comprise an absorbent material layer 21 constructed by mixing superabsorbent polymer (SAP) in fluff pulp (or comminuted pulp), superabsorbent polymer (SAP) 22 distributed over the upper surface of the absorbent material layer 21, and hydrophilic papers 23, 24 wrapped around the absorbent material layer 21 and the superabsorbent polymer 22. In the absorbent core 12, the hydrophilic paper 23 covers the lower surface and side surfaces along the long sides 2a, and the hydrophilic paper 24 covers the upper surface. The topsheet 13 may be bonded to the hydrophilic paper 24 through a hot-melt type adhesive that is applied in such a manner as not to interfere with passage of liquid.

In the absorbent core 12, the fluff pulp may have a basis weight of about 50 to 200 $g/m^2$, and the superabsorbent polymer may be distributed in an amount of about 15 to 100 $g/m^2$. The hydrophilic papers 23, 24 may be tissue made of pulp, which is hydrophilic fibers, and having a basis weight of about 10 to 20 $g/m^2$.

For the superabsorbent polymer contained in the absorbent material layer 21 and the superabsorbent polymer 22 distributed over the upper surface of the absorbent material layer 21, there may be used cross-linked sodium polyacrylate, copolymer of sodium polyacrylate and starch, or copolymer of polyacrylonitrile and cellulose. These polymers may be in a granular form.

A chemical solution is applied to the topsheet 13 in the absorbent region 2. In the embodiment shown in FIG. 1, the chemical solution is mainly present in first and second chemical solution-applied regions 4 and 5. In FIG. 1, Ox represents a centerline extending along the workpiece feed direction (or MD) during the manufacturing process. The first chemical solution-applied region 4 is spaced apart from the centerline Ox and located adjacent one long side 2a. The first chemical solution-applied region 4 is in the form of a strip extending straight in the X-direction with an almost constant width in the Y-direction.

In FIG. 1, Oa represents a first fold line along which the pet waste absorption sheet 1 is to be folded for packaging, as will be described later in more detail with reference to FIG. 5. The first chemical solution-applied region 4 lies between the first fold line Oa and the long side 2a. The first chemical solution-applied region 4 is formed by directly applying the chemical solution to the topsheet 13 in the manufacturing process. When the pet waste absorption sheet 1 is folded along the first fold line Oa after application of the chemical solution, the top sheet 13 comes into contact with itself and the chemical solution of the first chemical solution-applied region 4 is transferred to form the second chemical solution-applied region 5.

The chemical solution contains at least one component selected from the group consisting of perfume, deodorant, and sterilant.

Examples of perfume include: alcohols such as geraniol, citronellol, citral, eugenol, phenethyl alcohol, thymol, linalool, leaf alcohol, menthol, benzyl alcohol; aldehydes such as hexylcinnamaldehyde; and galaxolide, which are capable of volatilizing from the top sheet 13 during use to perfume the ambient air. They are also expected to mask an offensive odor such as ammonia odor.

Examples of deodorant include catechin, tannim, flavonoid, polyphenol, laurel essential oil, sage essential oil, ginger essential oil, and peppermint essential oil, which are capable of decomposing a variety of malodorous components. Examples of sterilant include benzalkonium salt, benzethonium chloride, and methyl-isopropyl phenol, which are capable of killing bacteria in urine and feces.

The perfume, deodorant, and sterilant may be added to a solvent such as dipropylene glycol, ethanol, and glycerin and applied in liquid form to the topsheet 13.

For application of the chemical solution, there may be employed various methods such as spraying from above the topsheet 13. In order to prevent dispersion to the surrounding area during the manufacturing process of the pet waste absorption sheet 1, however, the chemical solution is preferably applied by bringing a coater 51 into direct contact with the topsheet 13, as shown in FIG. 5.

FIG. 3 shows a folded pet waste absorption sheet 1A to be wrapped in a packaging material. The folded pet waste absorption sheet 1A is formed such that the pet waste absorption sheet 1 is first folded along the first fold line Oa, which is parallel to the centerline Ox, to bring one end portion (or first end portion) of the topsheet 13 into face-to-face contact with an intermediate portion of the topsheet 13 and then folded along a second fold line Ob, which is also parallel to the centerline Ox, to have the other end portion (or second end portion) of the topsheet 13 on the backsheet 11. Thus, the pet waste absorption sheet 1 is folded in three for packaging. In the folded state, both the first and second chemical solution-applied regions 4, 5 are not exposed externally. Accordingly, the chemical solution of the first and second chemical solution-applied regions 4, 5 is effectively prevented from volatilizing out of the folded pet waste absorption sheet 1A.

Furthermore, since the chemical solution is not applied to the second end portion of the topsheet 13 in the manufacturing process, the chemical solution hardly adheres to the backsheet 11. Particularly when the topsheet 13 is a nonwoven fabric containing hydrophilic fibers or synthetic resin fibers treated to be hydrophilic, there is a possibility that the chemical solution of the second chemical solution-applied region 5 will spread to the second end portion of the topsheet 13 due to capillary action. However, since the amount of chemical solution per unit area of the topsheet 13 is relatively small in the second chemical solution-applied region 5, it is not necessary to worry about too much transfer of the chemical solution from the topsheet 13 to the backsheet 11.

Here, the first chemical solution-applied region 4 should not be limited to a single strip shown in FIGS. 1 and 4. For example, the chemical solution may be applied in stripes or a wavy line. Alternatively, the first end portion and the intermediate portion of the topsheet 13 may be coated entirely or almost entirely with the chemical solution before folding.

When using the pet waste absorption sheet 1, the package is opened and then the folded pet waste absorption sheet 1A shown in FIG. 3 is taken out and spread on a floor or a bottom face of a tray-type pet toilet. Since the first end portion and the intermediate portion of the topsheet 13 are kept in face-to-face contact with each other in the folded state shown in FIG. 3, the chemical solution of the first and second chemical solution-applied regions 4, 5 can spread on the absorbent region 2. When the pet waste absorption sheet 1 is unfolded as shown in FIG. 4, accordingly, the chemical solution will be present in a large area of the absorbent region 2.

When pets such as dogs and cats step on the topsheet 13 and discharge urine, the urine can be deodorized and sterilized by the chemical solution while passing through the topsheet 13. This is effective in preventing the urine absorbed in the absorbent core 12 from emitting an offensive odor. The perfume, which can volatilize from the topsheet 13, is effective in masking an offensive odor.

FIG. 5 is a schematic diagram showing a manufacturing process of the pet waste absorption sheet 1 shown in FIGS. 1 to 4. In FIG. 5, the arrow MD represents the workpiece feed direction in the manufacturing process.

In the step (A) of FIG. 5, a strip absorbent core 112, which becomes the absorbent core 12, is continuously fed onto a strip backsheet 111, which becomes the backsheet 11. The strip backsheet 111 and the strip absorbent core 112 are bonded to each other through a hot-melt type adhesive. In the strip absorbent core 112, continuously extending hydrophilic papers 23, 24 are used as carrier sheets and the rectangular absorbent material layers 21 covered with the superabsorbent polymer 22 are spaced apart in the MD and sandwiched between the hydrophilic papers 23, 24.

In the step (A) of FIG. 5, furthermore, a strip topsheet 113, which becomes the topsheet 13, is continuously fed onto the strip absorbent core 112. The strip absorbent core 112 and the strip topsheet 113 are bonded to each other through a hot-melt type adhesive. On both sides of the strip absorbent core 112, the strip backsheet 111 and the strip topsheet 113 are bonded to each other through the hot-melt type adhesive. In the step (B) of FIG. 5, thus, there is obtained a strip composite 101 of the strip backsheet 111, the strip absorbent core 112, and the strip topsheet 113.

In the step (C) of FIG. 5, the chemical solution is applied to the upper surface of the strip topsheet 113 with the coater 51 to form the first chemical solution-applied region 4 after formation of the strip composite 101. The first chemical solution-applied region 4 lies between the first fold line Oa and one long side 2a of the absorbent region 2. Here, it is preferred that the chemical solution discharged from the coater 51 is not directly applied to the peripheral region between the long side 2a of the absorbent region 2 and the long side 1a of the pet waste absorption sheet 1. Such direct application of the chemical solution to the peripheral region may decrease the bonding strength between the strip backsheet 111 and the strip topsheet 113 due to the hot-melt type adhesive.

In the step (D) of FIG. 5, the strip composite 101 is folded along the first fold line Oa to bring the first end portion of the strip topsheet 113 into face-to-face contact with the intermediate portion of the strip topsheet 113. Accordingly, the chemical solution of the first chemical solution-applied region 4 is transferred to the intermediate portion of the strip topsheet 113, thereby forming the second chemical solution-applied region 5 near the centerline Ox, as shown in FIGS. 1, 3, and 4.

In the step (E) of FIG. 5, the strip composite 101 is further folded along the second fold line Ob into a folded strip composite 101A of a three-layered structure. Thus, the second end portion of the strip topsheet 113 lies on the strip backsheet 111. Since the chemical solution is not applied to the second end portion of the strip topsheet 113, the chemical solution hardly adheres to the strip backsheet 111.

In the step (F) of FIG. 5, the folded strip composite 101A is cut between adjacent absorbent material layers 21 to obtain the folded pet waste absorption sheet 1A. In the step (G) of FIG. 5, the folded pet waste absorption sheet 1A is further folded along a lateral fold line Oc, which is perpendicular to the MD, into a finished product 1B. The finished product 1B is individually wrapped and sealed in a packaging sheet. Alternatively, a plurality of the finished products 1B may be wrapped and sealed in a packaging sheet.

In the manufacturing process shown in FIG. 5, the chemical solution is applied after the steps (A) and (B). Therefore, the chemical solution hardly adheres to a conveyor or roller of the production line at the steps (A) and (B). Moreover, the contact of the coater 51 with the strip topsheet 113 at the step (C) for direct application of the chemical solution from the coater 51 to the strip topsheet 113 prevents dispersion to the surrounding area. Furthermore, since the first end portion of the strip topsheet 113 is folded upon the intermediate portion at the step (D) immediately after application of the chemical solution with the coater 51, the chemical solution hardly adheres to a conveyor or roller of the production line after the step (D).

Accordingly, the production line does not need frequent cleaning to remove the chemical solution from the conveyor or roller.

Although the present invention has been illustrated and described with respect to exemplary embodiments thereof, it should be understood by those skilled in the art that the foregoing and various other changes, omission and additions may be made therein and thereto, without departing from the spirit and scope of the present invention. For example, the pet waste absorption sheet 1 may be first folded in two along the centerline Ox with the topsheet 13 facing inside and then folded in four to bring the backsheet 11 into contact with itself. In this folded state, the topsheet 13 faces itself almost over the entire area of the absorbent region 2. Accordingly, even if the chemical solution is applied to the topsheet 13 almost over the entire area of the absorbent region 2, the chemical solution can be confined between the confronting faces of the topsheet 13. Thus, the chemical solution hardly adheres to the surrounding area or the backsheet 11.

The present invention should not be understood as limited to the specific embodiments set out above but should be understood to include all possible embodiments which can be embodied within a scope encompassed and equivalent thereof with respect to the feature set out in the appended claims.

What is claimed is:

1. A pet waste absorption sheet comprising:
    a liquid-impermeable backsheet;
    a liquid-permeable topsheet; and
    an absorbent core disposed between the backsheet and the topsheet, the topsheet having a chemical solution containing at least one component selected from the group consisting of perfume, deodorant, and sterilant, wherein
    the topsheet is a nonwoven fabric impregnated with the chemical solution,
    the pet waste absorption sheet is folded for packaging such that at least a first portion of the topsheet is folded upon itself,
    the chemical solution is directly applied in a strip to the first portion of the topsheet in a first region only which is parallel to and laterally displaced to a single side of a longitudinal centerline of the pet waste absorption sheet, the strip further being disposed between a first fold line created by folding the first portion of the topsheet upon itself and a first lateral edge of the pet waste absorption sheet, such that the strip is positioned between confronting faces of the first portion of the topsheet when the first portion of the topsheet is folded upon itself, and
    a second portion of the topsheet is folded upon the backsheet along a second fold line and is free of the chemical solution.

2. The pet waste absorption sheet of claim 1, wherein the topsheet is a resin film formed with apertures for passage of liquid.

3. The pet waste absorption sheet of claim 1, wherein a portion of the chemical solution in the strip positioned between confronting faces of the first portion of the topsheet is transferred to a second region positioned between the first fold line and a second fold line created by folding the second portion of the topsheet upon the backsheet.

4. The pet waste absorption sheet of claim 1, wherein the pet waste absorption sheet before folding is rectangular, and the strip is parallel to a longest side edge of the rectangular sheet.

5. The pet waste absorption sheet of claim 3, wherein the pet waste absorption sheet is further folded along a third fold line that is parallel to a shortest side edge of the rectangular sheet.

* * * * *